US006642068B1

(12) United States Patent
Hayes et al.

(10) Patent No.: US 6,642,068 B1
(45) Date of Patent: Nov. 4, 2003

(54) METHOD FOR PRODUCING A FIBER OPTIC SWITCH

(76) Inventors: Donald J. Hayes, 4304 Springhill Estates Dr., Parker, TX (US) 75002; Ting Chen, 1311 Rush Dr., Richardson, TX (US) 75081; W. Royall Cox, 7021 Eagle Vail Dr., Plano, TX (US) 75093

( * ) Notice: Subject to any disclaimer, the term of this patent is extended or adjusted under 35 U.S.C. 154(b) by 26 days.

(21) Appl. No.: 10/138,059

(22) Filed: May 3, 2002

(51) Int. Cl.[7] .............................................. H01L 21/00
(52) U.S. Cl. .......................................... 438/21; 438/24
(58) Field of Search ......................................... 346/140

(56) References Cited

U.S. PATENT DOCUMENTS

| | | |
|---|---|---|
| 2,481,620 A | 9/1949 | Rosenthal |
| 3,476,291 A | 11/1969 | Glaser |
| 3,900,034 A | 8/1975 | Katz et al. |
| 4,337,886 A | 7/1982 | Kinf et al. |
| 4,418,354 A | 11/1983 | Perduijn |
| 4,423,120 A | 12/1983 | Paulus et al. |
| 4,460,904 A | 7/1984 | Oszczakiewicz et al. |
| 4,461,294 A | 7/1984 | Baron |
| 4,485,386 A | 11/1984 | Dagna et al. |
| 4,522,903 A | 6/1985 | Heiart et al. |
| 4,527,717 A | 7/1985 | Emoto et al. |
| 4,600,424 A | 7/1986 | Flaming |
| 4,682,187 A | 7/1987 | Martner |
| 4,695,527 A | 9/1987 | Geissler et al. |
| 4,776,868 A | 10/1988 | Trotter, Jr. et al. |
| 4,812,856 A | 3/1989 | Wallace |
| 4,828,886 A | 5/1989 | Hieber |
| 4,832,024 A | 5/1989 | Boussignac et al. |
| 4,853,317 A | 8/1989 | Hayes |
| 4,891,043 A | 1/1990 | Zeimer et al. |
| 5,024,726 A | 6/1991 | Fujiwara |
| 5,053,100 A | 10/1991 | Hayes et al. |
| 5,090,609 A | 2/1992 | Nakao et al. |
| 5,092,864 A | 3/1992 | Hayes et al. |
| 5,193,738 A | 3/1993 | Hayes |
| 5,196,241 A | 3/1993 | Burke et al. |
| 5,208,980 A | 5/1993 | Hayes |
| 5,227,813 A | 7/1993 | Pies et al. |
| 5,229,016 A | 7/1993 | Hayes et al. |
| 5,235,352 A | 8/1993 | Pies et al. |
| 5,285,466 A | 2/1994 | Tabatabaie |
| 5,324,623 A | 6/1994 | Tsumori |
| 5,345,256 A | 9/1994 | Stortz |
| 5,365,645 A | 11/1994 | Walker et al. |
| 5,373,314 A | 12/1994 | Everett et al. |
| 5,377,092 A | 12/1994 | Rowand, Jr. et al. |
| 5,400,064 A | 3/1995 | Pies et al. |
| 5,402,162 A | 3/1995 | Fusting et al. |
| 5,406,319 A | 4/1995 | Hayes et al. |
| 5,414,916 A | 5/1995 | Hayes |
| 5,426,455 A | 6/1995 | Williamson et al. |
| 5,430,470 A | 7/1995 | Stortz |
| 5,433,809 A | 7/1995 | Pies et al. |

(List continued on next page.)

*Primary Examiner*—Hoai Ho
*Assistant Examiner*—Thao P Le

(57) ABSTRACT

A method for forming a micro-optical switch component includes providing a semiconductor substrate having a surface. An opto-electronic device is integrated into the semiconductor substrate at a site. A pedestal of microlens material is formed on the semiconductor substrate surface at the site of the opto-electronic device. The pedestal extends from the semiconductor substrate surface and has a top surface spaced apart from the semiconductor substrate surface. A print head is provided and contains an optical fluid which is hardenable and capable of serving as a micro-optical element. The printhead includes an orifice from which microdroplets of the optical fluid are ejected in response to control signals. Optical fluid is deposited onto the top surface of the pedestal to thereby form a micro-optical element on the pedestal.

26 Claims, 5 Drawing Sheets

U.S. PATENT DOCUMENTS

| | | |
|---|---|---|
| 5,435,060 A | 7/1995 | Hayes et al. |
| 5,436,648 A | 7/1995 | Stortz et al. |
| 5,444,467 A | 8/1995 | Stortz |
| 5,498,444 A | 3/1996 | Hayes |
| 5,577,064 A | 11/1996 | Swirhun et al. |
| 5,681,757 A | 10/1997 | Hayes |
| 5,707,684 A | 1/1998 | Hayes et al. |
| 5,736,074 A | 4/1998 | Hayes et al. |
| 5,812,582 A | 9/1998 | Gilliland et al. |
| 5,835,514 A | 11/1998 | Yuen et al. |
| 5,852,689 A * | 12/1998 | Donald ........................ 385/21 |
| 6,015,083 A | 1/2000 | Hayes et al. |
| 2001/0033712 A1 * | 10/2001 | Cox et al. ..................... 385/33 |
| 2003/0002778 A1 * | 1/2003 | Bach et al. .................... 385/16 |

* cited by examiner

METHOD FOR PRODUCING A FIBER OPTIC SWITCH

TECHNICAL FIELD OF THE INVENTION

The present invention relates to methods for forming micro-optical switch components, and more particularly to an integrated fiber optic switch.

BACKGROUND OF THE INVENTION

The demand for high-speed data transmission has accelerated the development of optical networks. For a local area network and very short reach data links, high efficiency and low equipment/operational cost have become central issues for meeting market needs. Local networks have evolved to include the use of vertical-cavity surface-emitting lasers (VCSEL) and PIN photodetector (PD) as light transmitters and receivers, respectively, and use multimode fiber (MMF) as signal transport media. A VCSEL is a diode laser where the laser oscillation and output occur normal to the PIN junction plane. Such lasers are formed in a structure of semiconductor layers deposited on a semiconductor substrate, and emit light from a port in the surface of the structure. A VCSEL generates a much more symmetrical light beam than an edge-emitting laser. As a result, the light from the VCSEL can be coupled into the optical system of a laser printer or optical communication link more efficiently than the light from an edge-emitting laser. Low divergent circular output, single longitudinal mode operation, and high two-dimensional packaging density for arrays, make VCSELs attractive for applications such as optical recording, communications, and computing.

Parallel technology has been applied to VCSEL arrays, PD arrays and fiber ribbons. Specific electronic circuits for driving VCSELs, processing PDs output signals, as well as for implementing small factor connectors have gradually standardized transceivers for short range communications. However, deficiencies exist in dealing with giga-bit-per second level of transmission over reasonable distance with a single channel. These limitations occur from the integration of optoelectronic parts with electronic circuits. Current VCSEL-microlens array integration schemes utilize wire connectors in which the parasitic capacitance of the wire connection limits the data processing rate of the unit. As a result, size-sensitive applications, and chip level integration have been a focus in the development of VCSELs for telecommunication and data communication applications.

Application technologies for VCSELs, PDs and complimentary-metal-oxide-semiconductor (CMOS) electronic circuits are well known. However, the interconnections, both electrical and optical, are difficult due to the small physical size, specific geometry, and materials employed. The simultaneous achievement of both interconnect types creates additional difficulties due to interactions.

Existing approaches for integrated switches utilize flip-chip bonding to attach the VCSEL and detector array to a silicon chip. Light passes through vias etched on the silicon chip and is coupled to the fibers by a reflection mirror. Additionally, a co-planar design is utilized in which the n-contact of the VCSEL must be removed after bonding to leave a path for the top emitting laser. It is also possible to bond the n-contact to the substrate and then remove the substrate beyond the n-contact, resulting in bottom emitting. For other structures, many processing steps are required for electrical connection, etching, metal deposition, reflow and rinsing. Additional processing steps are necessary for the alignment and coupling of light into and out of fiber array. Existing designs have severe cost disadvantages. Therefore, a need has arisen for new optical switches with new fabrication methods to meet existing market needs.

SUMMARY OF THE INVENTION

In accordance with the present invention, a method for forming a small, low cost, integrated fiber optic switch is provided. The switch component is based upon VCSEL arrays and PD arrays, both coupled directly to an integrated circuit. The use of ink jet dispensing of polymers and solders create high quality optical and electrical interconnects to the active elements. Collimating and focusing polymer microlenses are printed directly onto the VCSEL arrays with photolithographic accuracy so that the light emitting from the VCSELs will directly couple into arrays of optical fibers. Collimating and focusing polymer microlenses are also utilized for coupling light from optical fibers into detector arrays. Ink jet dispensing of solders is utilized to electrically interconnect the active optical elements to the integrated circuit with minimal interconnect distance.

In accordance with the present invention, a method for forming a micro-optical switch component includes providing a semiconductor substrate having a surface. An opto-electronic device is integrated into the semiconductor substrate at a site. A pedestal of microlens material is formed on the semiconductor substrate surface at the site of the opto-electronic device. The pedestal extends from the semiconductor substrate surface and has a top surface spaced apart from the semiconductor substrate surface. A print head is provided and contains an optical fluid which is hardenable and capable of serving as a micro-optical element. The print head includes an orifice from which micro-droplets of the optical fluid are ejected in response to control signals. Optical fluid is deposited onto the top surface of the pedestal to thereby form a micro-optical element on the pedestal.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1A:
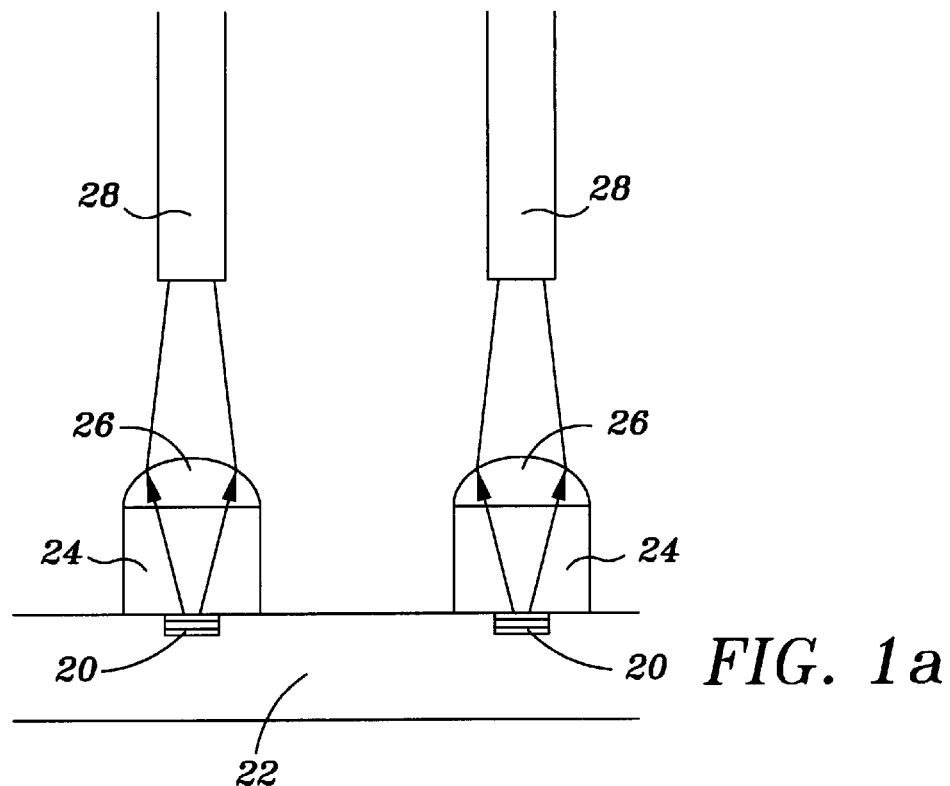
FIGS. 1a and 1b are schematic diagrams illustrating the formation of an opto-electronic component of an optical switch in accordance with the present invention.
Figure 1B:
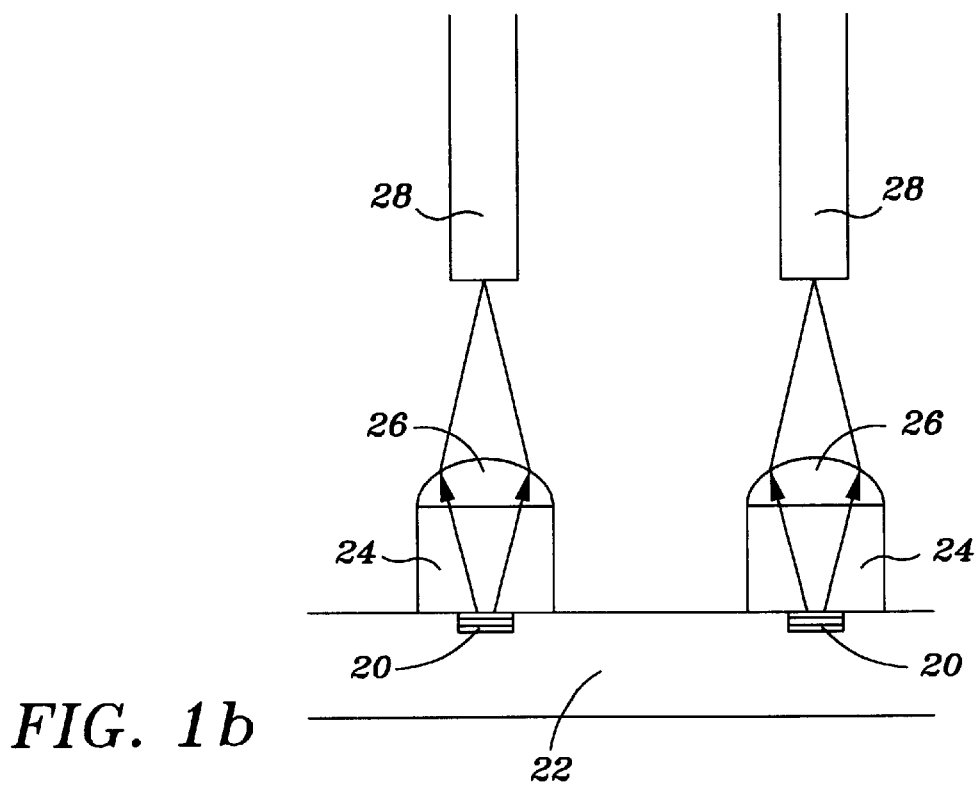

Referring to FIGS. 1a and 1b, schematic diagrams illustrating the formation of an optical switch component in the form of a VCSEL array is illustrated. A VCSEL 20 is formed in a semiconductor substrate 22 using techniques well known to those skilled in the art. Typical spacing between VCSELs in an array is about 250 microns, center-to-center. In accordance with the present method, a pedestal 24 is fabricated directly on substrate 22 at the site of VCSEL 20. A microlens 26 is formed directly on pedestal 24. Light emission of VCSEL 20 propagates through pedestal 24 and is coupled to an optical fiber 28 by microlens 26. FIG. 1a illustrates light being collimated when coupled to optical fiber 28, while FIG. 1b illustrates light being focused on to optical fiber 28.

Referring now to FIG. 2, the formation of pedestal 24 in accordance with the present invention is described. FIG. 2a illustrates the formation of a thick film 36 of photosensitive polymer with acceptable transmission properties at the VCSEL wavelength either positive or negative which is coated on substrate 22 by spin coating or other known methods. The thickness of film 36 is in the range of about 50 to about 250 microns. The thickness of film 36 corresponds to the height of pedestals 24.

Figure 2A:
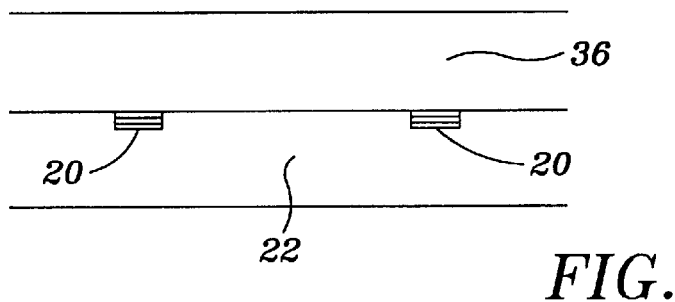
FIGS. 2a, 2b, 2c, and 2d are schematic diagrams illustrating the formation of a pedestal used with the present opto-electronic components.
Figure 2B:
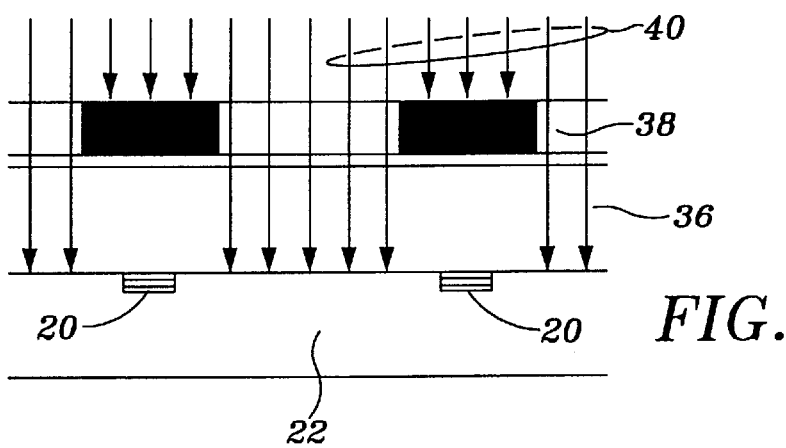
Figure 2C:
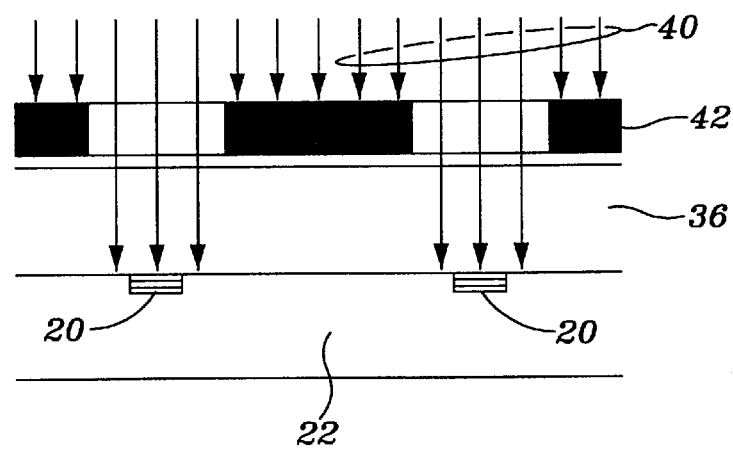

FIGS. 2b and 2c illustrate ultraviolet exposure of thick film 36 through a photomask containing a pattern of pedestals 24. FIG. 2b illustrates thick film 36 as a positive photosensitive polymer. A photomask 38 has mask sites located above VCSELs 20 for masking ultraviolet radiation 40 from the site of VCSELs 20 fabricated within substrate 22. FIG. 2c illustrates thick film 36 as a negative photosensitive polymer having a photomask 42 having mask sites for allowing ultraviolet radiation 40 to expose the surface of substrate 22 at the site of VCSEL 20. Photomasks 38 and 42 contain the pedestal 24 pattern which is aligned concentrically with the VCSEL 20 pattern on substrate 22. Photomasks 38 and 42 with reversed colors are used for positive and negative photomasks, respectively. The pre-exposure and post-exposure bake are performed before and after the exposure.

Figure 2D:
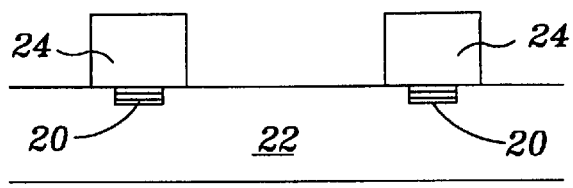

FIG. 2d illustrates the formation of pedestals 24 which are formed after pattern developing. The diameter of pedestals 24 is in the range of about 50 to about 225 microns. FIG. 2 illustrates one technique for forming pedestals 24, it being understood that other techniques can be used, and the present invention is not limited to the technique described. For example, a mask can be formed on the surface of a non-photosensitive film 36 and a dry etch technique used to form pedestals 24.

Figure 3:
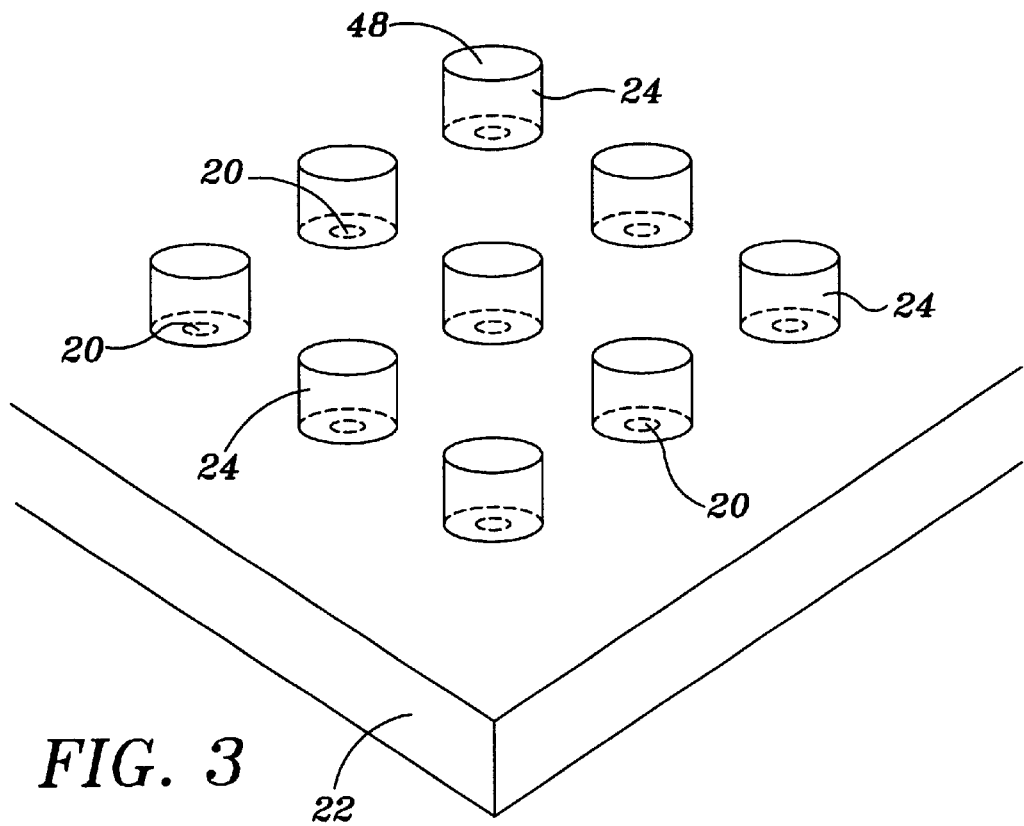
FIG. 3 is a schematic diagram illustrating the formation of a pedestal array on a semiconductor substrate.

FIG. 3 is a schematic diagram illustrating the formation of an array of pedestals 24 fabricated directly on semiconductor substrate 22 at the site of VCSELs 20. The array of pedestals 24 is aligned with the array of VCSELs 20. Although pedestals 24 are shown having a circular configuration, other shapes, such as, for example, elliptical can be used depending on the characteristics of light being emitted from VCSELs 20 and the coupling desired.

Figure 4:
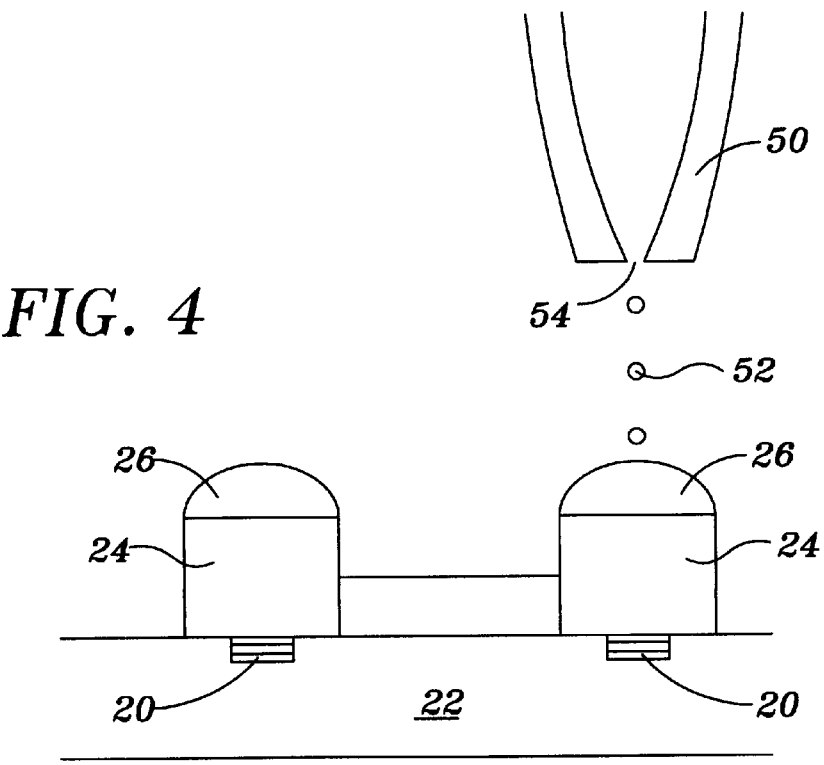
FIG. 4 is a schematic diagram illustrating the formation of a microlens on a pedestal.

Referring now to FIG. 4, in accordance with the present invention, microlenses 26 are printed directly on the top surface 48 (FIG. 3) of pedestals 24. A fluidic optical polymer is printed directly on top surface 48 of pedestals 24 to form a microlens 26 upon curing. Each microlens 26 is self-centered to the underlying pedestal 24 by surface tension of the dispensed fluid. The height of microlens 26 is in the range of about 25 to about 120 microns, depending upon the design of optical coupling to optical fiber 28.

Microlens 26 printing is performed using a digitally-driven printhead 50 depositing a predetermined size and number of micro-droplets 52 of optical fluid onto surface 48 of pedestals 24 to form microlenses 26. Methods of operating printhead 50 to deposit optical polymeric material in a fluid state are disclosed in U.S. Pat. Nos. 5,498,444 and 5,707,684 both entitled "Method for Producing Micro-Optical Components" by the assignee hereof, the disclosures of which are incorporated herein by reference. Printhead 50 ejects micro-droplets 52 of optical fluid through an orifice 54. The diameter of orifice 54 is preferably between about 20 microns to about 120 microns. Printhead 50 includes a piezoelectric device operable in a drop-on-demand mode and is heatable to control the viscosity of the optical fluid. The movement of printhead 50 and substrate 22 relative to each other is computer-controlled. Substrate 22 is positioned on a computer-controlled stage moveable in the x-y plane. The computer moves the stage so that a pedestal 24 is positioned to receive optical fluid micro-droplets 52 deposited by the digitally-driven printhead 50. Ejection of micro-droplets 52 by printhead 50 is preferably controlled by the same computer. After printing a microlens 26, the computer moves substrate 22 to position the next pedestal 24 under the ejection orifice 54 and then activates printhead 50 to eject the micro-droplets 52 onto the next pedestal 24. The height of microlens 26 is determined by the number and size of micro-droplets 52 deposited on top surface 48 of pedestals 24.

The optical fluid utilized by printhead 50 can be any material, or combination of materials, capable of forming a relatively transparent micro-optical element after hardening. Optical epoxies are an example. Commercial materials which are suitable for forming micro-optical lenses 26 include Summers Optical SK9 (Refractive Index 1.49) by Summers Optical, Inc., P.O. Box 162, Fort Washington, Pa. 19034; Norland No. NOA-73 (Refractive Index 1.56) by Norland Products, Inc., P.O. Box 7149, New Brunswick, N.J. 08902; and Epotek No. OG-146 (Refractive Index 1.48) by Epoxy Technology, Inc., 14 Fortune Drive, Billerica, Mass. 01821. In a preferred embodiment of the present method, an ultraviolet (UV) light-curable epoxy is utilized to form microlenses 26. When used, the diameter of the epoxy micro-droplets 52 is in the range of about 8 microns to about 300 microns. Typically, micro-droplets 52 would be in the range of about 50 microns.

Figure 5:
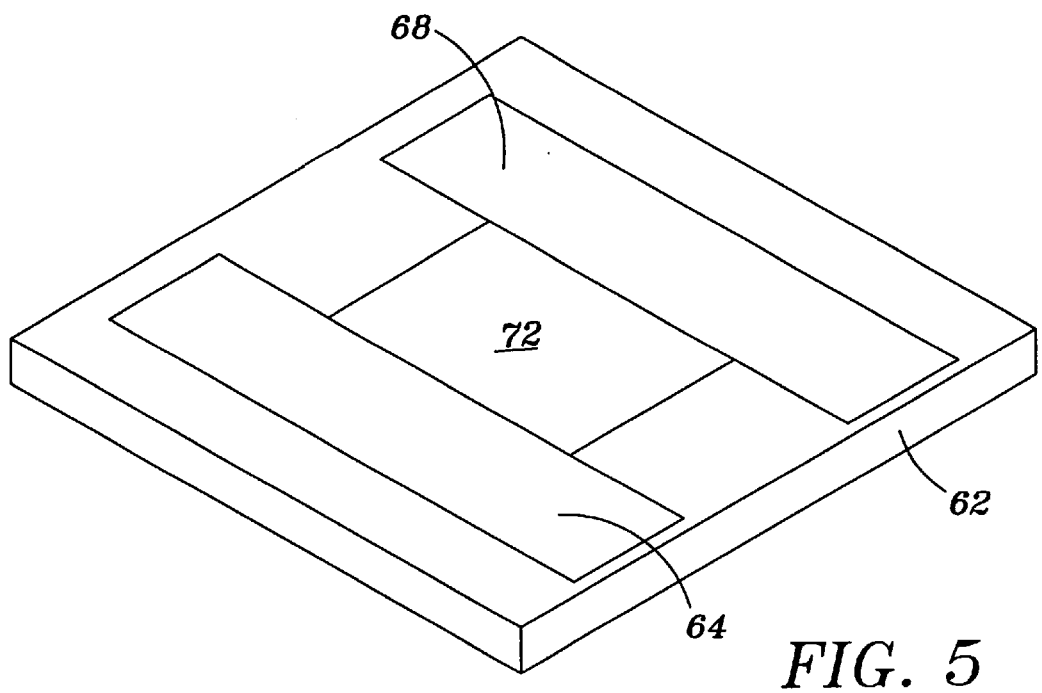
FIG. 5 is a block diagram illustrating the components of a semiconductor substrate for use with the present method for forming an optical switch.
Figure 6:
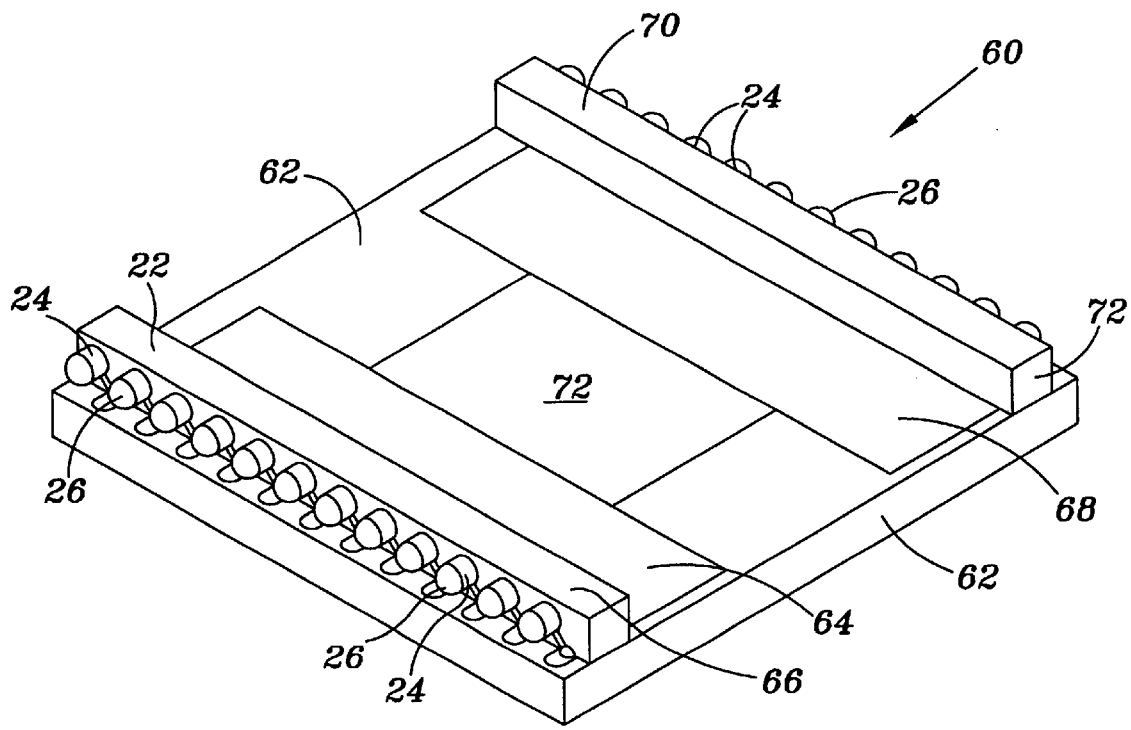
FIG. 6 is a schematic block diagram illustrating the formation of a VCSEL array and PD-array formed on the semiconductor substrate of FIG. 5.

Referring now simultaneously to FIGS. 5 and 6, a fiber optic switch generally identified by the numeral 60, is illustrated as produced by the method of the present invention. Switch 60 is formed on a semiconductor substrate 62 such as, for example, a silicon integrated circuit. Semiconductor substrate 62 includes three subsystems, a laser driver array 64 for driving VCSELs 20 formed in a VCSEL array 66, a transimpedance amplifier array 68 coupled to a photodetector (PD) array 70 and an electronic switching subsystem 72. Photodetector array 70 is composed of multiple PIN photodetectors formed in a substrate 72 and includes pedestals 24 and microlenses 26 fabricated in a manner similar to the fabrication of pedestals 24 and 26 previously described with respect to VCSELs 20. VCSELs 20 and PIN diodes of photodetector array 70 are formed utilizing methods described in, for example, U.S. Pat. Nos. 5,285,466; 5,577,064; 5,812,582, and 5,835,514, whose descriptions are hereby incorporated by reference.

Laser driver array 64, transimpedance amplifier 68 and electronic switching subsystem 72 are integrated into semiconductor substrate 62. Laser driver array 64 functions to provide appropriate currents for bias and modulation of the VCSELs 20. Laser drivers and driver arrays are manufactured and sold by AMCC and Maxim Integrated Products such as, for example, MAX3273 which has a programmable bias current range of about 1 mA to about 100 mA and a programmable modulation range of about 5 mA to about 60 mA and includes a power control circuit. Transimpedance amplifier array 68 includes front-end amplifiers to amplify the current from photodetector array 70 to produce a differential output voltage. Transimpedance amplifier array 68 may include, for example, an AMCC transimpedance amplifier S3090 which detects signals down to 19 $\mu$A(peak) with a signal-to-noise ratio of 21.5 dB. The outputs of this device are buffered and voltage limited to 1.4 v. Switching subsystem 72 receives an amplified signal from one of the PIN detectors of photodetector array 70 and routes the signal to a laser driver within laser driver array 64 which converts the digital signal to the analog signal that drives a VCSEL 20.

As illustrated in FIG. 6, photodetector array 70 and VCSEL array 66 are electrically bonded at right angles to semiconductor substrate 62. The size of a single VCSEL is approximately 250 microns on each edge and results in an approximate square cross-section. Photodiode array 70 may include, for example, PIN photodetectors having four element AlGaAs arrays on 250 micron centers.

Microlenses 26 associated with VCSEL array 66 function to couple light from VCSELs 20 to the optical fibers 28. Microlenses 26 associated with photodetector array 70 couple the fiber output light to the PIN detector surface. The parameters of pedestal 24 and microlens 26 (height, radius of curvature, index of refraction and diameter) are selected to maximize the coupling efficiency from VCSELs 20 to optical fibers 28 and from optical fibers 28 to photodetectors.

VCSELs 20 and PIN photodetectors formed in accordance with the present invention can also be utilized in optical transceivers in which a VCSEL 20 and phodetector are typically located on the same side of the integrated circuit. Additionally an array of alternating VCSELs 20 and photodetectors can be formed using the present optical components.

Figure 7:
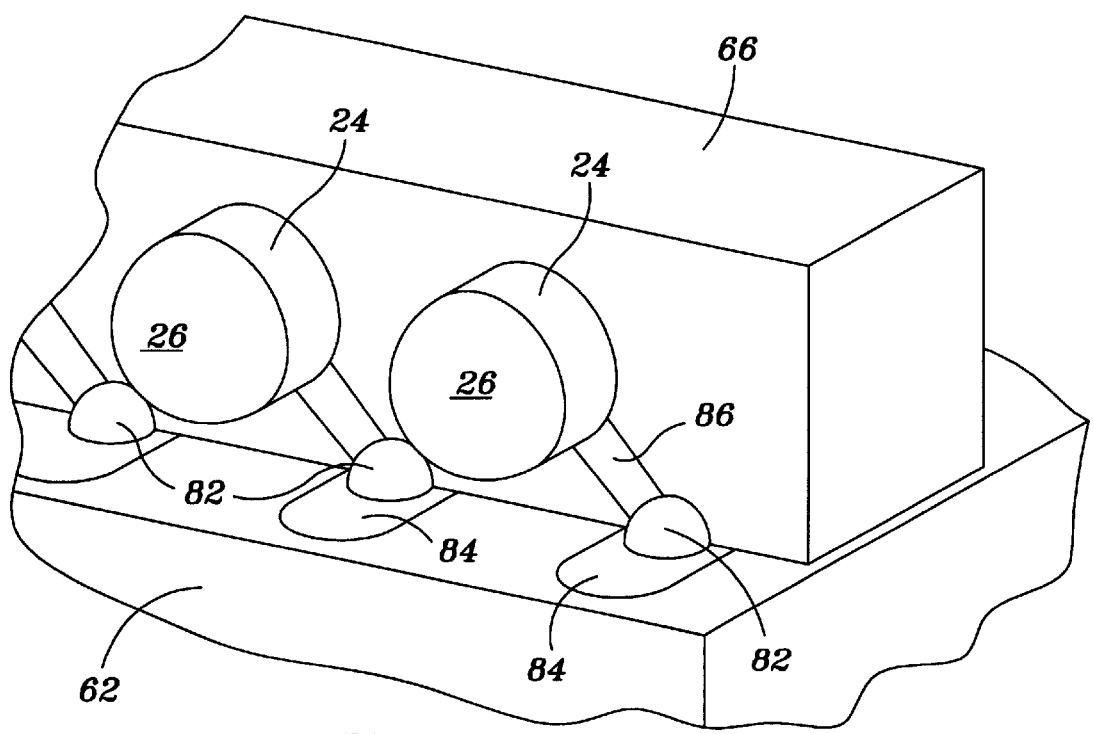
FIG. 7 is an enlarged perspective view of an electrical connection between a VCSEL and semiconductor substrate of the optical switch of FIG. 6.
Figure 8:
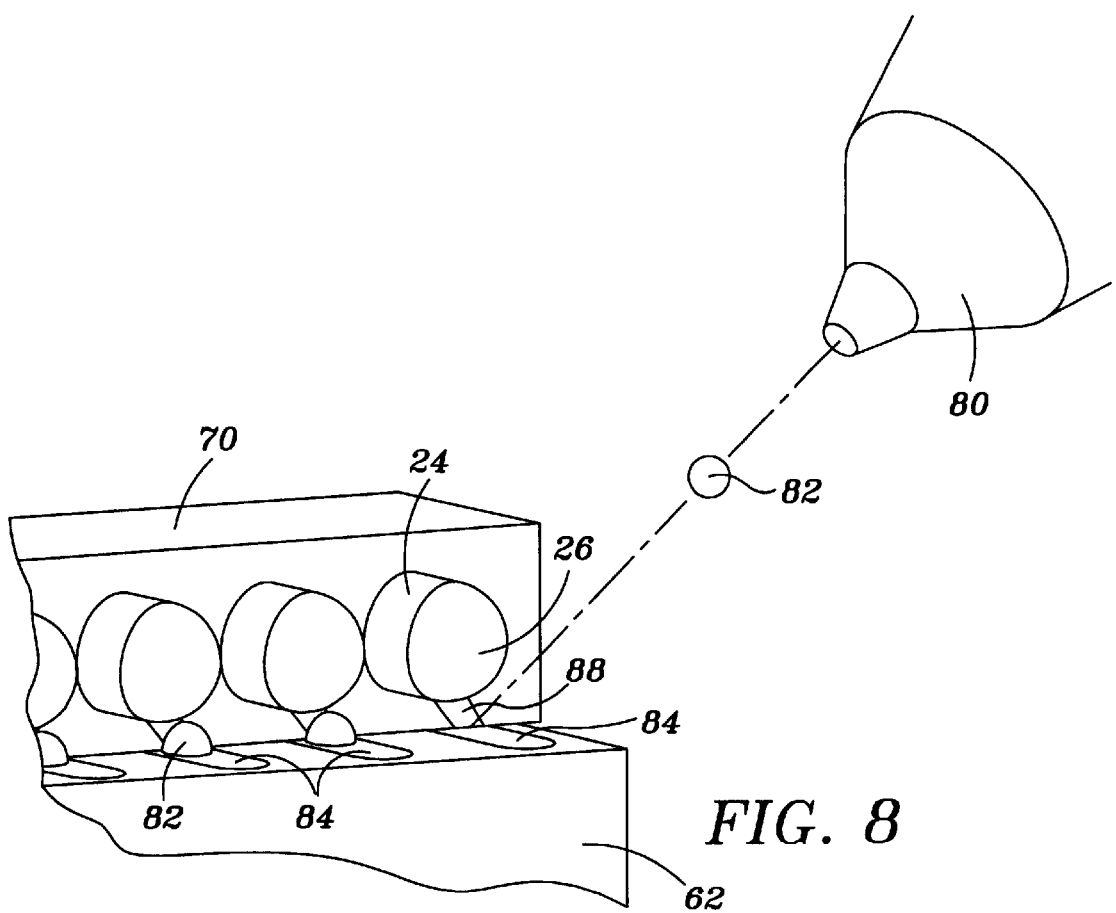
FIG. 8 is a schematic diagram illustrating an ejection head for dispensing solder for forming an electrical connection between an optoelectronic component and the semiconductor substrate of FIG. 5.

Referring now to FIGS. 7 and 8, the present method utilizes the print head 80 for dispensing microdroplets of solder 82 for electrically interconnecting VCSEL array 66 and photodetector array 70 to semiconductor substrate 62. The solder interconnect electrically connects a metal pad 84 on semiconductor substrate 62 to a metal pad 84 on VCSEL array 22 and a metal pad 88 on photodetector array 70 (FIG. 8). Print head 80 accurately places a molten drop of solder 82 at the location where the two pads meet. The solder will then flow and wet the pads and form a mechanical and electrical joint. The second electrode on the back of VCSEL array 66 and photodetector array 70 is connected using the same process. Methods of operating an ink jet print head to deposit solder are disclosed in U.S. Pat. Nos. 5,229,016 and 5,377,902 by the assignee hereof, the disclosures of which are incorporated by reference. As illustrated in FIG. 8, the bonding of pads 88 to pads 84 creates an approximate 90° solder joint and the jetting angle of print head 80 is at approximately 45° from normal to semiconductor substrate 62. One of the main advantages of using ink jet deposition of solder is that it has been shown to be a fluxless process which is critical to keeping optical surfaces clean.

It therefore can be seen that the present method provides for the formation of an integrated fiber optic switch based upon VCSEL arrays and PD arrays, both coupled directly to an integrated circuit. Ink jet dispensing of polymers and solders is used to create high quality optical and electrical interconnects to the active elements. Collimating and focusing polymer microlenses are printed directly on the VCSEL arrays and PD arrays with photolithographic techniques so that light emitting from the VCSELs will directly couple into arrays of optical fibers and light emitting from optical fibers will be directly coupled to detector arrays. The optical fibers may be multimode or single mode.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A method for forming a micro-optical switch component, comprising:

providing a semiconductor substrate having a surface;

integrating an opto-electronic device in the semiconductor substrate at a site;

forming on the semiconductor substrate surface at the site of the opto-electronic device a pedestal of microlens material extending from the surface of the semiconductor substrate and having a top surface spaced apart from the semiconductor substrate surface;

providing a printhead containing an optical fluid which is hardenable and capable of serving as a micro-optical element, the printhead having an orifice from which micro-droplets of the optical fluid are ejected in response to control signals; and depositing optical fluid onto the top surface of the pedestal to thereby form a micro-optical element on the pedestal.

2. The method of claim 1 wherein providing a printhead further includes providing a piezoelectric device in the printhead operable in a drop-on-demand mode.

3. The method of claim 1 wherein providing the printhead includes providing a printhead having an orifice from which the micro-droplets of the optical fluid are ejected having a diameter of about 20 microns to about 120 microns.

4. The micro-optical switch component produced by the method of claim 1.

5. The method of claim 1 wherein integrating an opto-electronic device in the semiconductor substrate includes forming a VCSEL.

6. The method of claim 1 wherein integrating an opto-electronic device in the semiconductor substrate includes forming a PD diode.

7. The method of claim 1 wherein forming the pedestal includes:

forming a photosensitive polymer layer on the semiconductor substrate;

exposing the photosensitive polymeric layer through a photomask containing a pedestal pattern aligned with the site of the opto-electronic device; and developing the pattern.

8. The method of claim 7 wherein the photosensitive polymeric layer has a thickness of about 50 microns to about 250 microns.

9. The method of claim 1 wherein the top surface of the pedestal is formed circular in shape having a diameter of about 50 microns to about 225 microns.

10. The method of claim 1 wherein the microlens is formed having a height of about 25 microns to about 120 microns.

11. The method of claim 1 wherein depositing optical fluid onto the top surface of the pedestal includes depositing a plurality of micro-droplets of the optical fluid.

12. A method for forming a micro-optical switch, comprising:

provide a first semiconductor substrate having a surface;

integrating a VCSEL device in the first semiconductor substrate at a site;

forming on the first semiconductor substrate surface at the site of the VCSEL device a first pedestal of microlens material extending from the surface of the first semiconductor substrate and having a top surface spaced apart from the first semiconductor substrate surface;

providing a printhead containing an optical fluid which is hardenable and capable of serving as a micro-optical element, the printhead having an orifice from which micro-droplets of the optical fluid are ejected in response to control signals;

depositing optical fluid onto the top surface of the first pedestal to thereby form a micro-optical element on the first pedestal;

providing a second semiconductor substrate having a surface;

integrating a PD diode in the second semiconductor substrate at a site;

forming on the second semiconductor substrate surface at the site of the PD diode a second pedestal of microlens material extending from the surface of the second semiconductor substrate and having a top surface spaced apart from the second semiconductor substrate surface;

providing the printhead containing an optical fluid which is hardenable and capable of serving as a micro-optical element, the printhead having an orifice from which micro-droplets of the optical fluid are ejected in response to control signals;

depositing optical fluid onto the top surface of the second pedestal to thereby form a micro-optical element on the second pedestal;

providing an integrated circuit having a third semiconductor substrate having a surface, the integrated circuit including a laser driver, an amplifier and switching circuitry interconnecting the laser driver and amplifier;

connecting the VCSEL device to the third semiconductor substrate for contact with the laser driver; and connecting the PD diode to the third semiconductor substrate for contact with the amplifier.

13. The method of claim 12 wherein the VCSEL device and PD diode are connected at a 90° angle to the surface of the third semiconductor substrate.

14. The method of claim 12 and further including:

providing a printhead containing liquid solder, the printhead having an orifice from which spherically-shaped bodies of liquid solder are ejected in response to control signals; and depositing a plurality of spherically-shaped bodies of liquid solder to the VCSEL device and the third semiconductor substrate and to the PD diode and the third semiconductor substrate.

15. The method of claim 14 wherein the plurality of spherically-shaped bodies of liquid solder are directed toward the third semiconductor substrate at approximately a 45° angle with respect to the surface of the third semiconductor substrate.

16. The method of claim 12 wherein providing a printhead containing optical fluid further includes providing a piezoelectric device in the printhead operable in a drop-on-demand mode.

17. The method of claim 12 wherein providing the printhead containing optical fluid includes providing a printhead having an orifice from which the micro-droplets of the optical fluid are ejected having a diameter of about 20 microns to about 120 microns.

18. The micro-optical switch produced by the method of claim 12.

19. The method of claim 14 wherein providing a printhead containing liquid solder includes providing a piezoelectric device in the printhead operate in a drop-on-demand mode.

20. The method of claim 12 wherein forming the first and second pedestals includes:

forming a photosensitive polymer layer on the semiconductor substrates;

exposing the photosensitive polymeric layer through a photomask containing a pedestal pattern; and developing the pattern.

21. The method of claim 20 wherein the photosensitive polymeric layer has a thickness of about 50 microns to about 250 microns.

22. The method of claim 12 wherein the top surface of the pedestals is formed circular in shape having a diameter of about 50 microns to about 225 microns.

23. The method of claim 12 wherein the microlens is formed having a height of about 25 microns to about 120 microns.

24. The method of claim 12 wherein the VCSEL device and PD diode are connected on opposite sides of the third semiconductor substrate.

25. The method of claim 12 wherein the VCSEL device and PD diode are connected adjacent to one another on the third semiconductor substrate to form a transceiver device.

26. The method of claim 12 wherein the VCSEL device and PD diode are connected to the third semiconductor substrate in an array of alternating VCSEL devices and PD diodes.

* * * * *